United States Patent
Chen

(10) Patent No.: US 10,048,419 B2
(45) Date of Patent: Aug. 14, 2018

(54) METALLIC WIRE GRID POLARIZER AND MANUFACTURING METHOD THEREOF

(71) Applicant: Shenzhen China Star Optoelectronics Technology Co., Ltd., Shenzhen (CN)

(72) Inventor: Lixuan Chen, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 268 days.

(21) Appl. No.: 15/115,688

(22) PCT Filed: Jun. 15, 2016

(86) PCT No.: PCT/CN2016/085791
§ 371 (c)(1),
(2) Date: Jul. 31, 2016

(87) PCT Pub. No.: WO2017/193445
PCT Pub. Date: Nov. 16, 2017

(65) Prior Publication Data
US 2018/0106937 A1    Apr. 19, 2018

(30) Foreign Application Priority Data
May 9, 2016   (CN) .......................... 2016 1 0303897

(51) Int. Cl.
*G02B 5/30*    (2006.01)
*G02B 27/28*   (2006.01)
(Continued)

(52) U.S. Cl.
CPC .......... *G02B 5/3058* (2013.01); *B29C 59/022* (2013.01); *C23F 4/00* (2013.01); *B29L 2011/0066* (2013.01)

(58) Field of Classification Search
CPC ................ G02B 5/3058; B29C 59/022; B29L 2011/0066; C23F 4/00
(Continued)

(56) References Cited

U.S. PATENT DOCUMENTS

| 7,158,302 B2 * | 1/2007 | Chiu | G02B 5/3058 |
| | | | 359/485.03 |
| 7,722,194 B2 * | 5/2010 | Amako | G02B 5/1842 |
| | | | 349/114 |

(Continued)

FOREIGN PATENT DOCUMENTS

| CN | 101339266 A | 1/2009 | |
| WO | WO 2015056191 A1 * | 4/2015 | .......... G02B 5/1809 |

*Primary Examiner* — Collin X Beatty
(74) *Attorney, Agent, or Firm* — Leong C. Lei

(57) ABSTRACT

The present invention provides a metallic wire grid polarizer and a manufacturing method thereof. The metallic wire grid polarizer of the present invention includes a base plate (10) and a plurality of metallic wire grids formed on the base plate (10). The metallic wire grids are divided into first wire lines (21) and second wire lines (22) having different heights so as to form a dual-period wire-grid structure for achieving better optical performance and exhibiting more global optimization parameters for making modulation of the optical performance thereof more scientific and more flexible. The manufacturing method of the metallic wire grid polarizer of the present invention may make a wire grid structure having layers of different heights and the manufacturing operation is simple.

5 Claims, 4 Drawing Sheets

---

Step 1: providing a metal backing (100) and coating a layer of optical resin (300) on an upper surface of the metal backing (100);  — 1

Step 2: providing an imprint mold plate (500) and positioning the imprint mold plate on the optical resin (300) to conduct nano-imprinting so as to make the optical resin (300) that is located on the metal backing (100) forming a plurality of first photoresist strips (310) and a plurality of second photoresist strips (320) in an alternate arrangement, wherein a height of the first photoresist strips (310) is greater than a height of the second photoresist strips (320);  — 2

Step 3: removing the imprint mold plate (500) and conducting dry etching on the metal backing (500) with the optical resin (300) as a shielding layer so as to form, on the metal backing (500), first wire lines (21) corresponding to the first photoresist strips (310) and second wire lines (22) corresponding to the second photoresist strips (320) so as to form a metallic wire grid polarizer.  — 3

(51) Int. Cl.
*C23F 4/00* (2006.01)
*B29C 59/02* (2006.01)
*B29L 11/00* (2006.01)

(58) Field of Classification Search
USPC .................. 359/485.05, 487.05, 486.02
See application file for complete search history.

(56) References Cited

U.S. PATENT DOCUMENTS

| | | | | |
|---|---|---|---|---|
| 8,493,658 B2* | 7/2013 | Nishida | ............... | G02B 5/3058 |
| | | | | 359/485.05 |
| 8,913,321 B2* | 12/2014 | Davis | ............... | B82Y 20/00 |
| | | | | 359/485.05 |
| 2006/0126699 A1* | 6/2006 | Kaneda | ............... | G02B 5/1809 |
| | | | | 372/102 |
| 2007/0183035 A1* | 8/2007 | Asakawa | ............... | B82Y 20/00 |
| | | | | 359/485.05 |
| 2009/0040607 A1* | 2/2009 | Amako | ............... | G02B 5/1809 |
| | | | | 359/485.01 |

\* cited by examiner

METALLIC WIRE GRID POLARIZER AND MANUFACTURING METHOD THEREOF

BACKGROUND OF THE INVENTION

1. Field of the Invention

The present invention relates to the field of display technology, and in particular to a metallic wire grid polarizer and a manufacturing method thereof.

2. The Related Arts

Nano-imprint lithography (NIL) provides a breakthrough of the difficult of the traditional photolithography in reducing feature size and offers advantages of high resolution, low cost, and high throughput. Since 1995, nano-imprint lithography has evolved and diversified into various imprint techniques, which are widely used in various fields including semiconductor manufacture, micro-electro-mechanical system (MEMS), biochips, and biomedicine. The essence of the NIL technology is that a mold plate is used to transfer a pattern to a backing and the medium used for the transfer is a polymer film that is extremely thin so that measures, such as hot pressing or radiation, can be used to have the structure cured and hardened to preserve the transferred pattern. The entire process includes two processes of imprinting and pattern transferring. According to the difference of the imprinting process, NIL can be classified in three photolithographic techniques, including hot embossing, ultraviolet (UV) curing, and micro contact printing (μCP).

Various devices, such as liquid crystal displays (LCDs) and organic light-emitting diodes (OLEDs), necessarily involve polarizers. A traditional polarizer is generally composed of multiple layers of films, among which a core component is a polarization layer, which is often a polyvinyl alcohol (PVA) layer that comprises iodine molecule exhibiting an optical polarization effect. The next are protection layers, which are located on opposite sides of the polarization layer and are generally triacetyl cellulose (TAC) layers that are transparent for maintaining the polarization elements of the polarization layer in a stretched condition and preventing loss of moisture from the polarization element and protecting against external influence. The polarizer uses the absorption effect of the dichroic iodine molecules to generate polarized light. With the advancing of the NIL technology, attempts have been made in making small-sized metallic wire grid structures to provide a polarization effect for light within the wavelength range of visible light. Since the metallic wire grid structure absorbs only a small amount of light, one polarized component of natural light in one direction is reflected and one polarized component in another direction is allowed to pass, and thus, the reflected light can be recycled and reused through polarization rotation, providing extreme potential in liquid crystal displays.

SUMMARY OF THE INVENTION

An object of the present invention is to provide a metallic wire grid polarizer, in which a metallic wire grid is divided into first wire lines and second wire lines that have different heights in order to form a dual-period wire grid structure for providing better optic performance and having more global optimization parameters for making modulation of optical performance thereof more scientific and more flexible.

Another object of the present invention is to provide a manufacturing method of a metallic wire grid polarizer, which makes a wire grid structure having layers of different heights and the manufacturing operation is simple.

To achieve the above objects, the present invention provides a metallic wire grid polarizer, which comprises a base plate and a plurality of metallic wire grids formed on the base plate;

wherein the metallic wire grids are divided into first wire lines and second wire lines, such that a plurality of first wire lines and a plurality of second wire lines are alternately arranged on the base plate in a cyclic or periodic arrangement, the first wire lines having a first height H1, the second wire lines having a second height, the heights of the first wire lines and the second wire lines satisfying (H1−H2)/H1>10%.

The metallic wire grids have widths that are between 20-150 nm and a spacing distance between two adjacent metallic wire grids is between 20-150 nm.

The metallic wire grid polarizer further comprises a buffer layer arranged on the base plate and the plurality of metallic wire grids.

The plurality of metallic wire grids is arranged in an equally spaced manner on the base plate.

Each of the first wire lines is alternate with each of the second wire lines.

The present invention also provides a manufacturing method of a metallic wire grid polarizer, which comprises the following steps:

(1) providing a metal backing and coating a layer of optical resin on an upper surface of the metal backing;

(2) providing an imprint mold plate and positioning the imprint mold plate on the optical resin to conduct nano-imprinting so as to make the optical resin that is located on the metal backing forming a plurality of first photoresist strips and a plurality of second photoresist strips in an alternate arrangement, wherein a height of the first photoresist strips is greater than a height of the second photoresist strips;

(3) removing the imprint mold plate and conducting dry etching on the metal backing with the optical resin as a shielding layer so as to form a plurality of metallic wire grids on the metal backing, wherein the metallic wire grids are divided into first wire lines and second wire lines and wherein the first wire lines are formed as corresponding to the first photoresist strips and the second wire lines are formed as corresponding to the second photoresist strips so as to form a metallic wire grid polarizer that comprises the base plate and the plurality of metallic wire grids on the base plate;

wherein a plurality of first wire lines and a plurality of second wire lines are alternately arranged on the base plate in a cyclic or periodic arrangement, the first wire lines having a first height H1, the second wire lines having a second height H2, the heights of the first wire lines and the second wire lines satisfying (H1−H2)/H1>10%.

The metallic wire grids have widths that are between 20-150 nm and a spacing distance between two adjacent metallic wire grids is between 20-150 nm.

The plurality of metallic wire grids is arranged in an equally spaced manner on the base plate.

Each of the first wire lines is alternate with each of the second wire lines.

The imprint mold plate provided in step (2) comprises a plurality of first grid grooves and a plurality of second grid grooves, wherein the first grid grooves have a depth that is greater than a depth of the second grid grooves and the first photoresist strips and the second photoresist strips are formed as respectively corresponding to the first grid grooves and the second grid grooves; and step (3) further comprises removing a remaining portion of the optical resin after the dry etching and coating a buffer layer on the plurality of metallic wire grids so formed so that the metallic wire grid polarizer so obtained also comprises the buffer layer that is arranged on the base plate and the plurality of metallic wire grids.

The present invention further provides a metallic wire grid polarizer, which comprises a base plate and a plurality of metallic wire grids formed on the base plate;

wherein the metallic wire grids are divided into first wire lines and second wire lines, such that a plurality of first wire lines and a plurality of second wire lines are alternately arranged on the base plate in a cyclic or periodic arrangement, the first wire lines having a first height H1, the second wire lines having a second height, the heights of the first wire lines and the second wire lines satisfying (H1−H2)/H1>10%;

wherein the metallic wire grids have widths that are between 20-150 nm and a spacing distance between two adjacent metallic wire grids is between 20-150 nm;

further comprising a buffer layer arranged on the base plate and the plurality of metallic wire grids.

The efficacy of the present invention is that the present invention provides a metallic wire grid polarizer, which comprises a base plate and a plurality of metallic wire grids formed the base plate. The metallic wire grids are divided into first wire lines and second wire lines having different heights so as to form a dual-period wire-grid structure for achieving better optical performance and exhibiting more global optimization parameters for making modulation of the optical performance thereof more scientific and more flexible. The present invention provides a manufacturing method of a metallic wire grid polarizer, which makes a wire grid structure having layers of different heights and the manufacturing operation is simple.

BRIEF DESCRIPTION OF THE DRAWINGS

The features and technical contents of the present invention will be better understood by referring to the following detailed description and drawings of the present invention. However, the drawings are provided for the purpose of reference and illustration and are not intended to limit the scope of the present invention.

In the drawing.

DETAILED DESCRIPTION OF THE PREFERRED EMBODIMENTS

To further expound the technical solution adopted in the present invention and the advantages thereof, a detailed description is given to a preferred embodiment of the present invention with reference to the attached drawings.

Figure 1:
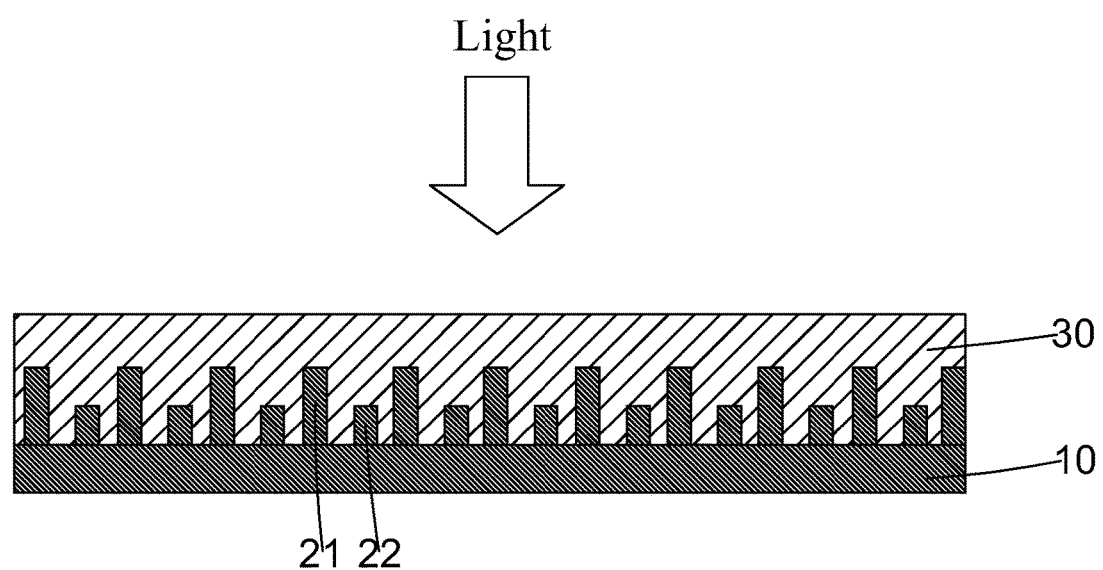
FIG. 1 is a schematic view illustrating a structure of a metallic wire grid polarizer according to the present invention.

Referring to FIG. 1, the present invention provides a metallic wire grid polarizer, which comprises a base plate 10 and a plurality of metallic wire grids formed on the base plate.

The metallic wire grids are divided into first wire lines 21 and second wire lines 22, such that a plurality of first wire lines 21 and a plurality of second wire lines 22 are alternately arranged on the base plate 10 in a cyclic or periodic arrangement. The first wire lines 21 have a first height H1, and the second wire lines 22 have a second height H2. The heights of the first wire lines 21 and the second wire lines 22 satisfy (H1−H2)/H1>10%.

Specifically, the metallic wire grids have widths that are between 20-150 nm and a spacing distance between two adjacent metallic wire grids is between 20-150 nm.

Specifically, the metallic wire grid polarizer further comprises a buffer layer 30 arranged on the base plate 10 and the plurality of metallic wire grids to protect the plurality of metallic wire grids on the metallic wire grid polarizer.

Specifically, as shown in FIG. 1, to use the metallic wire grid polarizer, one side of the base plate 10 that is provided with the metallic wire grids serves as a light incident surface to provide an effect of polarization on light passing therethrough. Particularly, each of the first wire lines 21 is alternate with each of the second wire lines 22. In other words, the plurality of first wire lines 21 and the plurality of second wire lines 22 are arranged in a cyclic or periodic manner according the sequence of high, low, high, low. The plurality of metallic wire grids is preferably arranged in an equally spaced manner on the base plate 10. Under this condition, a distance between two adjacent ones of the first wire lines 21 is equal to a distance between two adjacent ones of the second wire lines 22. In addition, the plurality of first wire lines 21 and the plurality of second wire lines 22 can be arranged in a cyclic or periodic manner according to different high-low alternating structure, such as a sequence of high, high, low, high, high, low, or a sequence of high, high, low, low, high, high, low, low.

The present invention provides a metallic wire grid polarizer, which comprises metallic wire grids divided into first wire lines 21 and second wire lines 22 that have different heights so as to provide a dual-period wire-grid structure for achieving better optical performance and exhibiting 15 global optimization parameters for making modulation of the optical performance thereof more scientific and more flexible.

Figure 2:
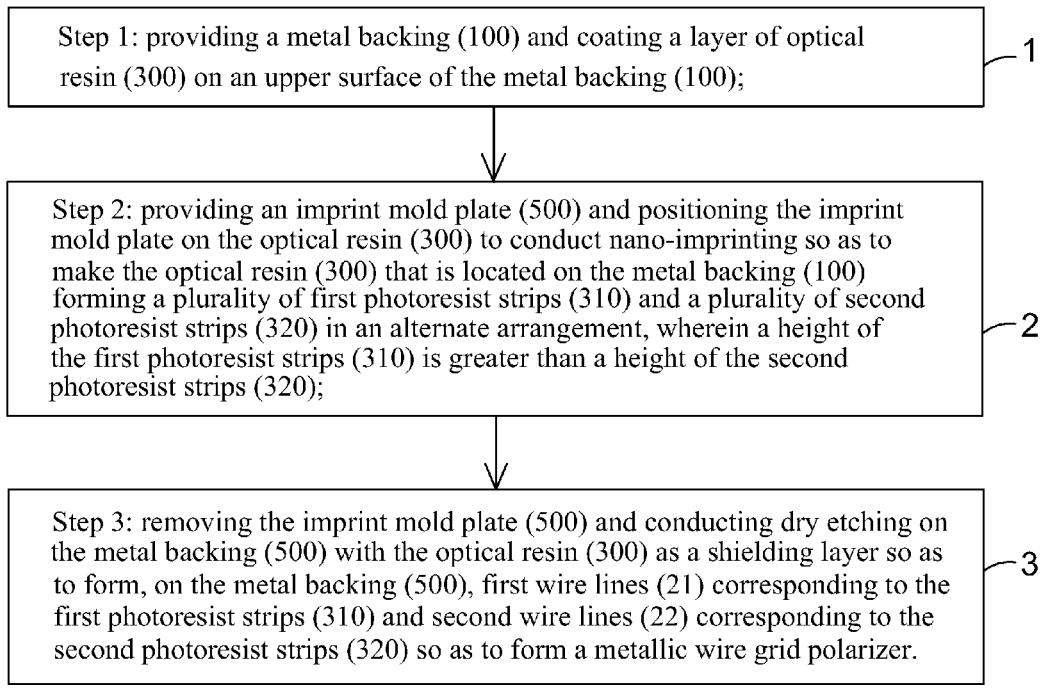
FIG. 2 is a flow chart illustrating a manufacturing method of a metallic wire grid polarizer according to the present invention.
Figure 3:
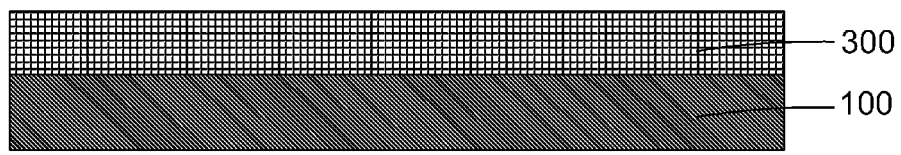
FIG. 3 is a schematic view illustrating step 1 of the manufacturing method of the metallic wire grid polarizer according to the present invention.

Referring to FIG. 2, in combination with FIG. 1, the present invention also provides a manufacturing method of a metallic wire grid polarizer, which comprises the following steps:

Step 1: as shown in FIG. 3, providing a metal backing 100 and coating a layer of optical resin 300 on an upper surface of the metal backing 100.

Figure 4A:
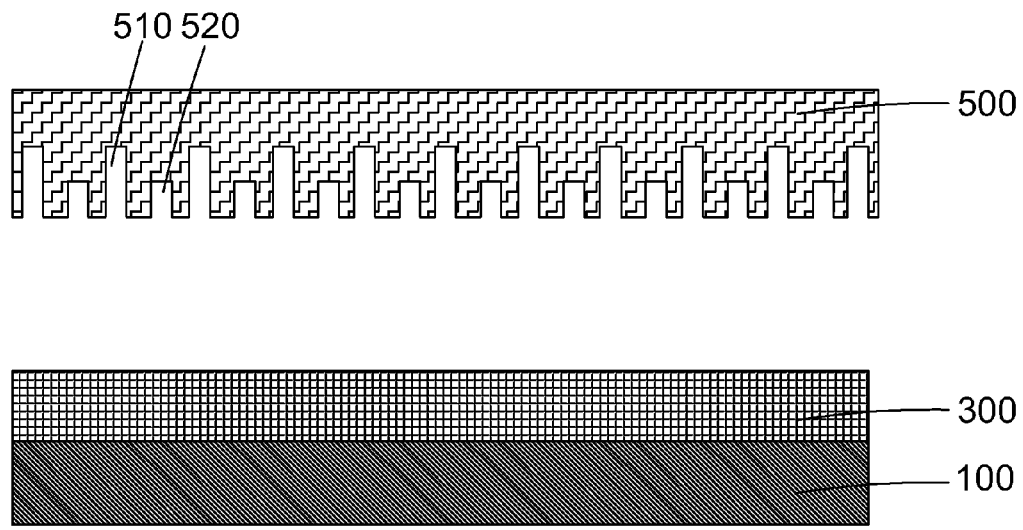
FIGS. 4a-4b are schematic views illustrating step 2 of the manufacturing method of the TFT array substrate metallic wire grid polarizer according to the present invention.
Figure 4B:
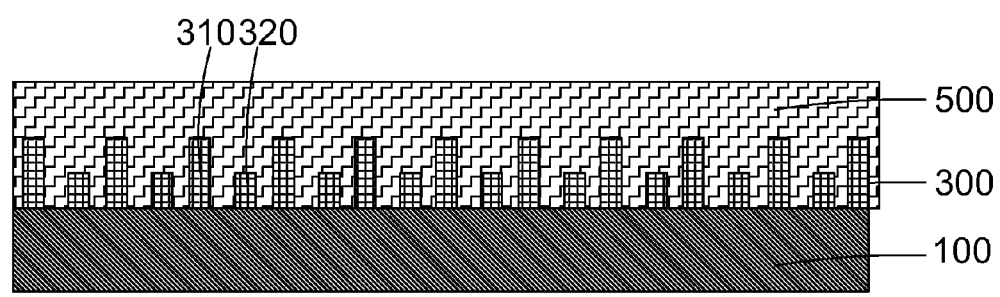

Step 2: as shown in FIGS. 4a-4b, providing an imprint mold plate 500 and positioning the imprint mold plate on the optical resin 300 to conduct nano-imprinting so as to make the optical resin 300 that is located on the metal backing 100 forming a plurality of first photoresist strips 310 and a plurality of second photoresist strips 320 in an alternate arrangement, wherein a height of the first photoresist strips 310 is greater than a height of the second photoresist strips 320.

Specifically, the imprint mold plate 500 provided in Step 2 comprises a plurality of first grid grooves 510 and a plurality of second grid grooves 520, wherein the first grid grooves 510 have a depth that is greater than a depth of the second grid grooves 520 and the first photoresist strips 310 and the second photoresist strips 310 are formed as respectively corresponding to the first grid grooves 510 and the second grid grooves 520.

Figure 5:
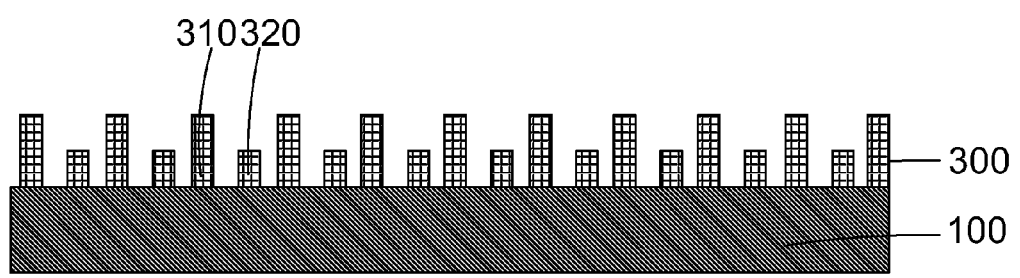
FIGS. 5-6 are schematic views illustrating step 3 of the manufacturing method of the metallic wire grid polarizer according to the present invention.
Figure 6:
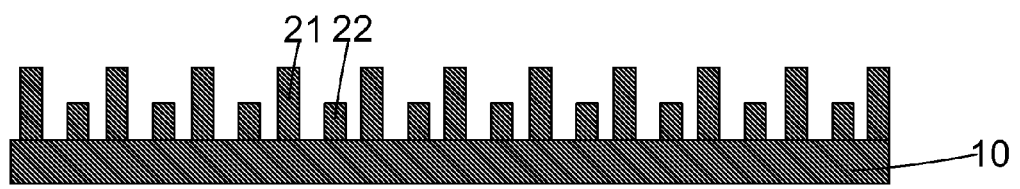

Step 3: as shown in FIGS. 5-6, removing the imprint mold plate 500 and conducting dry etching on the metal backing 500 with the optical resin 300 as a shielding layer so as to form a plurality of metallic wire grids on the metal backing 500, wherein the metallic wire grids are divided into first wire lines 21 and second wire lines and wherein the first wire lines 21 are formed as corresponding to the first photoresist strips 310 and the second wire lines 22 are formed as corresponding to the second photoresist strips 320 so as to form a metallic wire grid polarizer.

The metallic wire grid polarizer comprises a base plate 10 and a plurality of metallic wire grids on the base plate 10, wherein a plurality of first wire lines 21 and a plurality of second wire lines 22 are alternately arranged on the base plate 10 in a cyclic or periodic arrangement. The first wire lines 21 have a first height H1, and the second wire lines 22 have a second height H2. The heights of the first wire lines 21 and the second wire lines 22 satisfy (H1−H2)/H1>10%.

Specifically, Step 3 further comprises removing a remaining portion of the optical resin 300 after the dry etching and coating a buffer layer 30 on the plurality of metallic wire grids so formed, as what shown in FIG. 1, so that the metallic wire grid polarizer so obtained also comprises the buffer layer 30 that is arranged on the base plate 10 and the plurality of metallic wire grids.

Specifically, the metallic wire grids have widths that are between 20-150 nm and a spacing distance between two adjacent metallic wire grids is between 20-150 nm.

Particularly, each of the first wire lines 21 is alternate with each of the second wire lines 22 on the base plate 10. In other words, the plurality of first wire lines 21 and the plurality of second wire lines 22 are arranged in a cyclic or periodic manner according the sequence of high, low, high, low. The plurality of metallic wire grids is preferably arranged in an equally spaced manner on the base plate 10. Under this condition, a distance between two adjacent ones of the first wire lines 21 is equal to a distance between two adjacent ones of the second wire lines 22. In addition, the plurality of first wire lines 21 and the plurality of second wire lines 22 can be arranged in a cyclic or periodic manner according to different high-low alternating structure, such as a sequence of high, high, low, high, high, low, or a sequence of high, high, low, low, high, high, low, low.

In summary, the present invention provides a metallic wire grid polarizer, which comprises a base plate and a plurality of metallic wire grids formed the base plate. The metallic wire grids are divided into first wire lines and second wire lines having different heights so as to form a dual-period wire-grid structure for achieving better optical performance and exhibiting more global optimization parameters for making modulation of the optical performance thereof more scientific and more flexible. The present invention provides a manufacturing method of a metallic wire grid polarizer, which makes a wire grid structure having layers of different heights and the manufacturing operation is simple.

Based on the description given above, those having ordinary skills of the art may easily contemplate various changes and modifications of the technical solution and technical ideas of the present invention and all these changes and modifications are considered within the protection scope defined by the claims of the present invention.

What is claimed is:

1. A manufacturing method of a metallic wire grid polarizer, comprising the following steps:
   (1) providing a metal backing and coating a layer of optical resin on an upper surface of the metal backing;
   (2) providing an imprint mold plate and positioning the imprint mold plate on the optical resin to conduct nano-imprinting so as to make the optical resin that is located on the metal backing forming a plurality of first photoresist strips and a plurality of second photoresist strips in an alternate arrangement, wherein a height of the first photoresist strips is greater than a height of the second photoresist strips;
   (3) removing the imprint mold plate and conducting dry etching on the metal backing with the optical resin as a shielding layer so as to form a plurality of metallic wire grids on the metal backing, wherein the metallic wire grids are divided into first wire lines and second wire lines and wherein the first wire lines are formed as corresponding to the first photoresist strips and the second wire lines are formed as corresponding to the second photoresist strips so as to form a metallic wire grid polarizer that comprises the base plate and the plurality of metallic wire grids on the base plate;
   wherein a plurality of first wire lines and a plurality of second wire lines are alternately arranged on the base plate in a cyclic or periodic arrangement, the first wire lines having a first height H1, the second wire lines having a second height H2, the heights of the first wire lines and the second wire lines satisfying (H1−H2)/H1>10%.

2. The manufacturing method of the metallic wire grid polarizer as claimed in claim 1, wherein the metallic wire grids have widths that are between 20-150 nm and a spacing distance between two adjacent metallic wire grids is between 20-150 nm.

3. The manufacturing method of the metallic wire grid polarizer as claimed in claim 1, wherein the plurality of metallic wire grids is arranged in an equally spaced manner on the base plate.

4. The manufacturing method of the metallic wire grid polarizer as claimed in claim 1, wherein each of the first wire lines is alternate with each of the second wire lines.

5. The manufacturing method of the metallic wire grid polarizer as claimed in claim 1, wherein the imprint mold plate provided in step (2) comprises a plurality of first grid grooves and a plurality of second grid grooves, wherein the first grid grooves have a depth that is greater than a depth of the second grid grooves and the first photoresist strips and the second photoresist strips are formed as respectively corresponding to the first grid grooves and the second grid grooves; and step (3) further comprises removing a remaining portion of the optical resin after the dry etching and coating a buffer layer on the plurality of metallic wire grids so formed so that the metallic wire grid polarizer so obtained also comprises the buffer layer that is arranged on the base plate and the plurality of metallic wire grids.

* * * * *